(12) United States Patent
Keyes

(10) Patent No.: US 7,103,426 B2
(45) Date of Patent: Sep. 5, 2006

(54) ANTICIPATORY HIGH FREQUENCY NOISE COMPENSATION IN A DISTRIBUTED PROCESS CONTROL SYSTEM

(75) Inventor: Marion A. Keyes, St. Louis, MO (US)

(73) Assignee: Rosemount Analytical Inc., Anaheim, CA (US)

( * ) Notice: Subject to any disclaimer, the term of this patent is extended or adjusted under 35 U.S.C. 154(b) by 362 days.

(21) Appl. No.: 10/352,624

(22) Filed: Jan. 28, 2003

(65) Prior Publication Data

US 2004/0148038 A1    Jul. 29, 2004

(51) Int. Cl.
G05B 9/02    (2006.01)

(52) U.S. Cl. .......................... 700/79; 700/73; 700/45; 702/191; 706/21; 363/39; 318/609

(58) Field of Classification Search ............ 700/1–306; 318/609; 701/225; 340/870.01; 718/103; 704/235; 702/191; 706/21; 363/39
See application file for complete search history.

(56) References Cited

U.S. PATENT DOCUMENTS

| | | | |
|---|---|---|---|
| 5,274,314 A | | 12/1993 | Maqueira |
| 5,719,774 A | * | 2/1998 | Rao et al. .................... 701/225 |
| 5,808,557 A | * | 9/1998 | Berge et al. ........... 340/870.01 |
| 5,892,679 A | | 4/1999 | He |
| 5,909,661 A | * | 6/1999 | Abramovitch et al. ...... 702/191 |
| 6,056,781 A | | 5/2000 | Wassick et al. |
| 6,275,854 B1 | | 8/2001 | Himmel et al. |
| 6,326,758 B1 | * | 12/2001 | Discenzo .................... 318/609 |
| 6,396,234 B1 | | 5/2002 | Tateishi |
| 6,725,101 B1 | * | 4/2004 | Sanchez et al. ............... 700/45 |
| 6,760,716 B1 | * | 7/2004 | Ganesamoorthi et al. ..... 706/21 |
| 6,775,157 B1 | * | 8/2004 | Honda ......................... 363/39 |
| 6,795,798 B1 | * | 9/2004 | Eryurek et al. ............. 702/188 |
| 2002/0060545 A1 | | 5/2002 | Inagaki et al. |

OTHER PUBLICATIONS

International Search Report for PCT/US03/29947 dated Feb. 11, 2004.

* cited by examiner

Primary Examiner—Anthony Knight
Assistant Examiner—Sunray Chang
(74) Attorney, Agent, or Firm—Marshall, Gerstein & Borun LLP

(57) ABSTRACT

A control system includes a measurement device capable of gathering high frequency process parameter data, a modeling routine which uses the high frequency parameter data to develop a model of the high frequency noise and a compensation routine that employs the developed model to adjust a control signal to thereby compensate for the high frequency noise present within the process parameter. The measurement device may measure a process variable at a relatively high frequency and send a subset of the measured data (e.g., the low frequency data) to a standard controller that generates a control signal to control the measured process parameter in any known manner. The modeling routine analyzes the high frequency data and develops a mathematical model of the high frequency noise within the process variable. The resulting mathematical model may then be used by the compensation routine to alter the standard control signal produced by the controller before that control signal is delivered to or used by the device being controlled.

31 Claims, 3 Drawing Sheets

ANTICIPATORY HIGH FREQUENCY NOISE COMPENSATION IN A DISTRIBUTED PROCESS CONTROL SYSTEM

TECHNICAL FIELD

The present invention relates generally to distributed process control networks and, more specifically, to reducing high frequency noise within distributed process control networks.

DESCRIPTION OF THE RELATED ART

Large continuous manufacturing processes, for example, chemical paper, and petroleum manufacturing processes, utilize numerous strategically located field devices to monitor and control key process parameters within the manufacturing process. The key process parameters may be measured or monitored using, for example, flow meters, velocity sensors, pressure transducers and thermocouples, or may be manipulated or controlled using such devices as valve positioners, servo motors, heating elements, etc.

Historically, manufacturing processes have relied upon manual control systems, such as an operator reading a pressure gauge and adjusting an associated pressure valve, to monitor and control key process parameters. Manufacturing processes utilizing early automatic controls systems included local pneumatic controllers, transmitters and valve positioners to effect control of key process parameters at discrete locations within the process. Eventually, local pneumatic control systems were augmented by electro-mechanical systems that offered the potential of near deterministic control of local process parameters using individual process control loops. A simplified example of such a process control loop is illustrated schematically in FIG. 1. The process control loop 10 includes a controller 12, which may be a digital computer, such as a programmable logic controller (PLC), executing a process control routine 16 which may be a software program or a hardwired collection of analog elements such as switches, capacitors and inductors arranged to execute a process control routine. The controller 12 is adapted to perform a control operation to generate a control signal U which is then communicated to a process 14. The control signal U instructs the process 14 to perform some function, such as opening a valve, adjusting the stroke of a cylinder, changing a temperature setting, etc., in accordance with the process control routine 16 executed within the controller 12. The performance of the process, in response to the control signal U, is described by a process variable X which represents, for example, the flow rate through a valve, the displacement of a cylinder, or the temperature in a chemical vat. The process variable X is measured by a measurement device 18 to produce a process variable output Y. The measurement device 18, then communicates the process variable output Y as a feedback signal to the controller 12. The controller 12, in turn, compares the process variable output Y with a stored set point SP to determine an error signal E. The controller 12 then executes the process control routine 16, which may be a PI (Proportional-Integral), a PID (Proportional-Integral-Derivative), fuzzy logic or any other type of control technique, based on the error signal E and the set point SP to generate a revised control signal U. In this manner, the controller drives the loop 10 to cause the process variable output Y to be equal to the desired set point SP.

The proliferation of microprocessor based distributed control networks (DCNs) has enabled the process control industry to migrate from systems relying on local control, such as the ones described above, to distributed systems that allow for greater overall control of the process, while employing a less physically complex control system. A typical DCN often includes one or more conveniently located user interfaces (UIs), such as personal computers or industrial touch screen computers. The user interface may be adapted to store and implement a monitoring program which may be designed to collect data from the individual controllers for presentation to the user. Typically, the user interface is connected through a computer network to one or more controllers using an open source communications protocol, such as the ethernet protocol. The controller may be adapted to store and implement a global process control routine that integrates and oversees the operations of numerous local process control routines that include control and monitor devices distributed throughout the physical process. These control and monitoring devices, typically called field devices, are connected to the controller thereby allowing key process parameters, such as temperature, pressure, and flow rate, to be monitored and controlled. The system may further include one or more field devices known as "smart devices" which are capable of implementing limited control schemes or other operations, such as calibration, alarm generation, etc., independently of or in conjunction with the controller.

The DCN may be configured to include any number of subnets or smaller networks that interact with the user interface through a controller. The actual configuration of each subnet may vary based on, for example, the process parameters to be monitored and controlled, the communication protocol utilized by that subnet, such as HART®, Foundation FIELDBUS® and PROFIBUS® protocols, and the hardware requirements of the individual devices connected to that subnet. A subnet configured with a number of smart devices such as Fieldbus devices, could, if so desired, operate as an independent process control network contained within the main DCN. A DCN configured with subnets in this manner requires less frequent input from the controller which, in turn, frees computing resources within the controller that may then be used to perform other functions or implement more detailed control routines.

Communications within a typical DCN are generally multiplexed between the controller and the field devices to manage network bandwidth availability and prevent the possibility of overloading the controller with information caused by all of the devices attempting to communicate simultaneously. Typically, communications are managed by assigning each field device (or subnet) a communications window, essentially a reserved time interval within the controller's scan cycle, during which information can be sent between the controller and the field device. This type of periodic communication assures that only one field device is communicating with the controller during any given time interval, which in turn prevents the controller from being overloaded with information. Periodic communications, while effective at managing controller resources and network bandwidth, create an unavoidable communications delay between the controller and the individual field device because communications to or from the field device must be delayed until, the communications window assigned to the device occurs within the scan cycle.

Process control systems employing this periodic communication loop often operate at a relatively low speed scan cycle, compared to the processing speed of the controller, because the response time of the monitored and controlled process parameters is typically orders of magnitude slower than the scan cycle. Utilizing a faster communications loop is generally prohibitively expensive and is usually unnecessary. However, a control system utilizing a low speed scan cycle is unable to compensate for high frequency process variations which generally have a duration less than the round-trip communications time between the measurement device and the controller developing the compensating control signal.

SUMMARY

A method and apparatus that compensates for high frequency process variations or noise in a distributed control network includes a measurement device capable of gathering high frequency process parameter data, a modeling routine which uses the high frequency parameter data to develop a model of the high frequency noise in a process parameter and a compensation routine that uses the developed model to adjust a control signal to thereby compensate for the high frequency noise present within the process parameter. The measurement device may measure a process variable at a relatively high frequency and send a subset of the measured data (e.g., the low frequency data) to a standard controller that generates a control signal to control the measured process parameter in any known manner. The high frequency process parameter data may, however, be communicated directly to the modeling routine to minimize the communications lag and to manage network bandwidth utilization. The modeling routine analyzes the high frequency data and develops a mathematical model of the high frequency noise within the process variable. The resulting mathematical model may then be used by the compensation routine to alter the control signal produced by the controller before that control signal is delivered to or used by the device being controlled. In one embodiment, the compensation routine or the modeling routine may use the model to develop a transfer function for the high frequency noise, and may then, invert the transfer function. The resulting inverted transfer function of the high frequency noise may then be multiplied by the control signal to produce an adjusted control signal that compensates for the high frequency noise within the process parameter being controlled.

DETAILED DESCRIPTION

Figure 2:
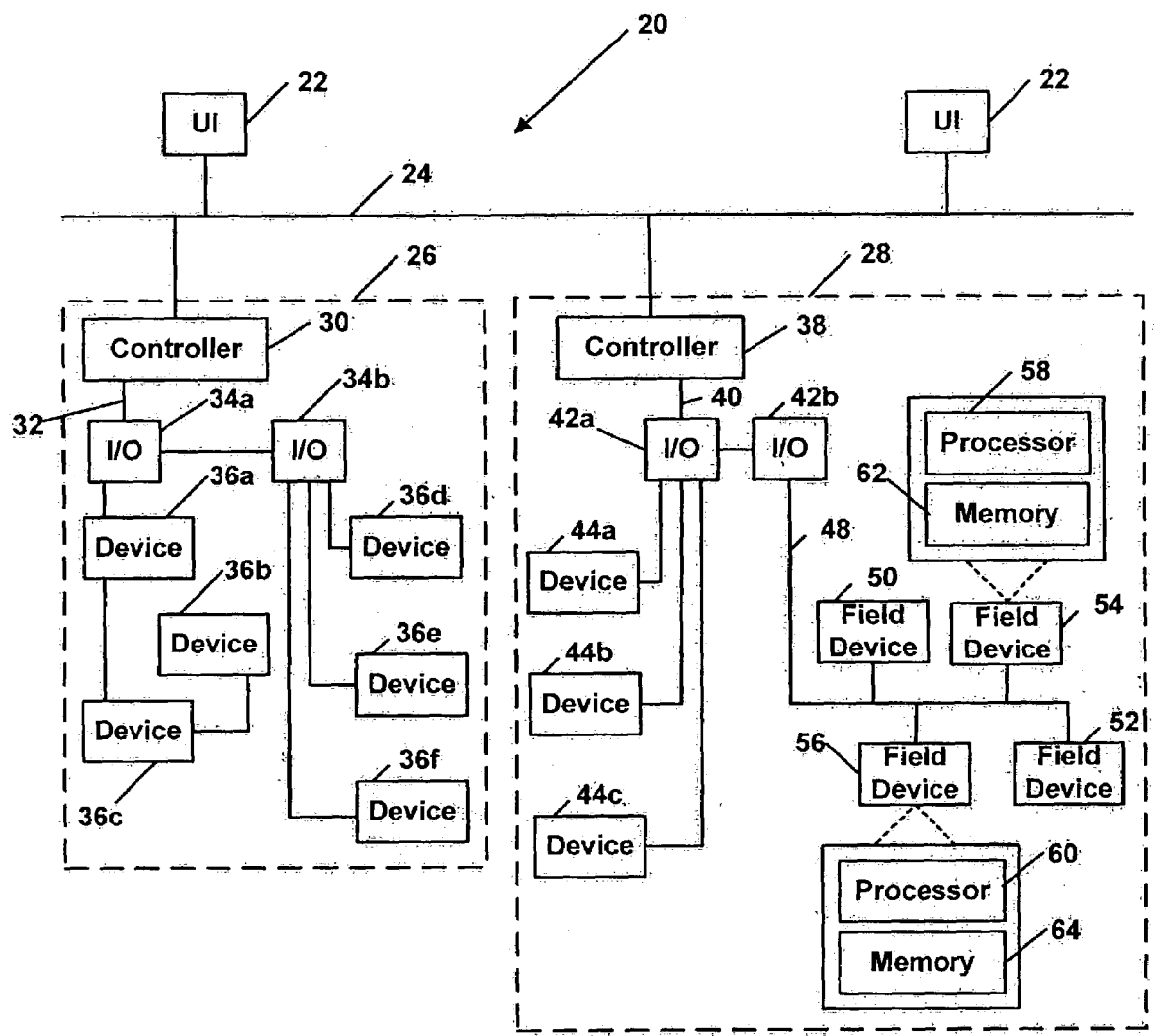
FIG. 2 is a schematic block diagram of a distributed control network including a subnet that provides high frequency noise compensation.

FIG. 2 illustrates a distributed control network 20 (DCN) including two user interfaces (UIs) 22 communicatively connected to a physical communications network 24, which may be an ethernet or any other desired communication network. The DCN 20 further includes subnets 26 and 28, each or both of which may utilize any proprietary or open source communication protocols, such as the HART®, PROFIBUs® and Foundation FIELDBUS® protocols. The subnet 26 illustrated in FIG. 2 includes a controller 30 which may be a personal computer, a programmable logic controller, a stand alone processor, etc., which is, among other things, adapted to store and implement process control routines and communicate with the UIs 22. The controller 30 is communicatively connected through a local physical network 32, which may be a proprietary or open source backplane, to a pair of input/output (I/O) devices 34a and 34b. The I/O device 34a is illustrated as communicating over a bus or in a ring configuration such as that associated with the PROFIBUS protocol, while the I/O device 34b is illustrated as communicating in the point to point topography required by the HART protocol. The I/O devices 34a and 34b are depicted in communication with numerous field devices 36a–36f using the HART and PROFIBUS communication protocols. The I/O devices 34a and 34b could, if so desired, utilize any other of a number of known communications protocols to provide communications between the controller 30 and the field devices 36a–36f connected thereto. The field devices 36a–36f may include, but are not limited to, measurement devices, such as temperature, pressure, flow rate, or control devices, such valves and positioners which operate to control a process parameter.

The subnet 28 illustrated in FIG. 2 similarly includes a controller 38 connected through a physical network 40 to a pair of I/O devices 42a, 42b. The I/O device 42a is coupled to a plurality of field devices 44a–44c, which may be, for example, HART devices. The I/O device 42b is connected to various Fieldbus devices 50–56 using a Fieldbus loop 48. Of course the Fieldbus devices 50–56 are capable of operating independently of each other, and communicating directly to the controller (via the I/O device 42b) or to each other via the Fieldbus loop 48. The Fieldbus devices 54 and 56, by way of example, are smart devices which include a processor 58 and 60 and a memory 62 and 64, respectively. The Fieldbus devices 54 and 56 are capable of storing routines, such as function blocks or control modules which may be executed on processors 58 and 60. The memories 62 and 64 may also be used to store data, such as the process variable data gathered by the smart devices 54 and 56 or other data provided by another device, for example device 50 or 52, over the Fieildbus loop 48.

The Fieldbus devices 50–56, as well as the other devices within the subnets 26 and 28, may perform functions commonly found within standard process control loops, such as process variable measurement and control functions, in any desired or known manner. For example, the field device 50 may measure data and communicate that measured data in a periodic manner, via the I/O device 42b, to the controller 38. The controller 38 may implement a known process control routine using the measured data and may communicate a control signal over the loop 48 to the device 52 which may be, for example, a valve.

In order to perform high frequency noise compensation within a loop, one of the smart devices, such as the device 54, may measure or otherwise collect process variable data indicative of a process variable on which high frequency noise compensation is to be performed. In this example, the process variable measurements are taken at an interval faster than that required by the controller 38 to implement its standard control routine. Generally speaking, the process variable measurements will be taken at an interval at least twice as fast as the highest frequency of noise which is to be controlled or compensated within the process variable. It will be understood that the precise interval at which process variable measurements are to be made will generally depend on the type of modeling being performed to model the high frequency noise present within the process variable, as well as other factors influencing the compensation being performed to reduce the high frequency noise.

In this example, the device 54 will take and store the process variable measurements in its memory 62. The gathered process variable measurements include both the standard low frequency measurements of the process variable required by the controller 38 and measurements acquired at the faster interval that are indicative of the high frequency noise present within the process. Thus, process variable measurements taken at a slower interval (i.e., a subset of the total process variable measurements stored in the memory 62) may be used by the controller 38 to perform typical process control, while the high frequency noise compensation described herein used the aggregate (i.e. high frequency) process variable measurements made by the device 54. It is important to note that although, in this simplified example, the device 54, is providing both the low frequency measurements to the controller 38 and simultaneously collecting and storing the high frequency noise data needed for compensation, multiple devices may be used to acquire these different measurements.

In either event, the aggregate measurement data representative of the process variable is provided to a modeling routine that uses these high frequency measurements to determine a model representing the high frequency noise in the process parameter. Modeling routines which may be used to analyze process variable data are well known in the art and thus will not be described in detail herein. However, generally speaking, these routines may model the high frequency noise as a combination of one or more different types of noise, such as white noise, linear noise, or other time varying noise. Of course any type of noise model may be used as well including, for example, pattern matching the noise with predefined compensation schemes, pattern recognition or other noise modeling routines. In one embodiment, the model may use a Fourier analysis to determine the high frequency components of the error and the phase of the noise components. For example, the model may implement a filtered or non-filtered FFT (fast Fourier transform) technique or any other equivalent method to give a continuous stream of the time varying Fourier coefficients that describe the cyclic behavior of the noise. A trend may be continuously determined over a rolling time horizon using a simple continuous equivalent of a statistical linear fit, autoregressive independent moving averages, etc. The base value may also be determined by similar methods.

The modeling routine, which is typically within the measurement device but which may be in another device connected to the measurement device 54, generates the model or model coefficients associated with a noise model. The modeling routine then transfers this model (or the model coefficients) to a further compensation routine which uses the model or model coefficients to compensate for the high frequency noise. In one embodiment, the compensation routine (or the modeling routine if so desired), may produce a transfer function for the model. In some instances, the transfer function may be the model itself. The transfer function is then applied to the process control signal developed by the controller 38 before that control signal is provided to or used by the device being controlled. In this case, the transfer function may be inverted and multiplied by the control signal. However, other methods of applying the transfer function to modify the control signal may be used to produce a modified control signal that, when applied to the controlled device compensates for the high frequency noise present within the process. In one example, a determined compensating cyclic signal may be introduced at the actuator or control device slowly to thereby slowly effect the high frequency error in a manner so that the magnitude and phase of the compensation signal is adjusted via an online optimization method to minimize residual cyclic error. In another example, the components of the high frequency error and compensation signal may be continuously determined and adjusted. Of course, while the above description generally describes the operation of the high frequency noise compensation, it will be understood that the different routines may be located in different devices within the system.

Figure 1:
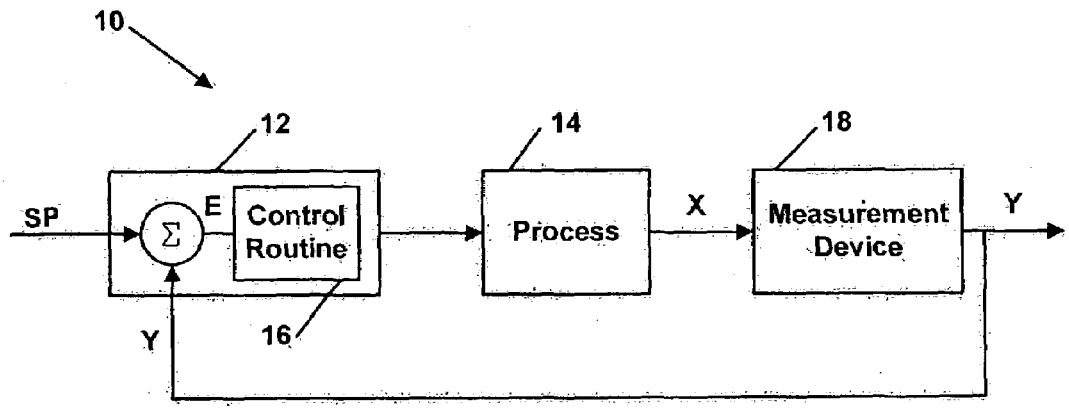
FIG. 1 is a schematic block diagram of a prior art control system.
Figure 3:
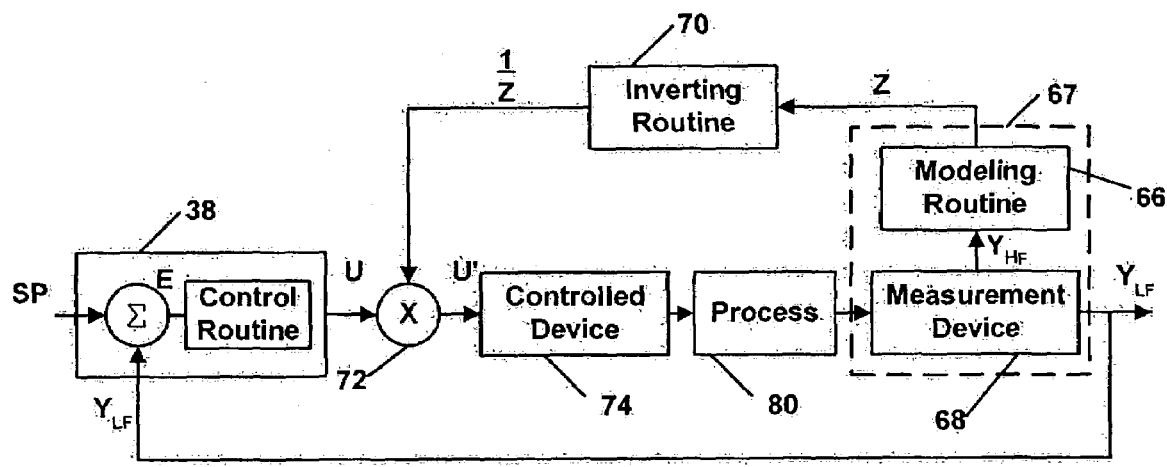
FIG. 3 is a schematic block diagram illustrating data flow within one embodiment of a high frequency noise compensations system.

For example, FIG. 3 illustrates a general block diagram of one embodiment of a high frequency noise compensation system implementing the elements discussed above. In this case, the measurement device 68 makes high frequency measurements $Y_{HF}$ and low frequency measurements $Y_{LF}$ of the process variable experiencing high frequency noise. The controller 38 develops an error signal E calculated as the difference between the low frequency measurements $Y_{LF}$ and the set point SP to produce a control signal U. Of course, the controller 38 here, and in the following cases, may receive the low frequency measurements $Y_{LF}$ in any standard manner, such as through regularly scheduled communications within a Fieldbus network. Similarly, the control signal U may be delivered to the controlled device or to any other device within the system using any desired types of communications. In one particular example, the communication devices may use data compression algorithms, such as Fourier data transformation algorithms to compress the data, and communicate the data as Fourier Sine and Cosine coefficients or other types of coefficients rather than as raw data sequences with reconstruction occurring at the receiving devices, workstations, computers, etc.

As illustrated in FIG. 3, the modeling routine 66 may be combined with measurement device 68 to create a single field device 67 or, alternatively, may be combined within another device communicatively connected to the measurement device 68 via, for example, the Fieldbus network 48. The modeling routine 66 receives the high frequency measurements $Y_{HF}$ and uses these measurements to develop a high frequency noise model transform Z. Because the aggregate measurement data containing the high frequency measurements $Y_{HF}$ is typically voluminous, it is would generally preferable to place the modeling routine 66 within the same field device 67 as the measurement device 68 thereby providing the modeling routine 66 with immediate access to the data without having to send the data over the Fieldbus loop 48. However, if desired, the modeling routine 66 may be placed in a different device, for example device 54, within the subnet and receive the data over the Fieldbus loop 48.

The modeling routine 66 uses the high frequency measurement data $Y_{HF}$ to create the model Z which may be a transfer function, or a set of parameters for a model indicative of the specific high frequency noise within the parameter Y or any other data defining a noise model. The model Z is then provided to an inverting routine 70 (which may be part of the modeling routine 66). The inverting routine 70 inverts the transfer function Z to develop an inverted transfer function (1/Z). Of course, any type of mathematical inverting routine may be used and the form of this routine will depend upon the type of model developed. The inverting routine 70 may be located in the same device or a different device than the modeling routine 66. If in a different device, the model Z (or the coefficients or parameters defining the model Z) is provided to the inverting routine 70 in a scheduled or unscheduled manner via a communication network, such as the Fieldbus loop 48.

Likewise, the inverted transfer function (1/Z) or data indicative thereof may be sent to a compensation routine 72 which may be in the same or a different device than the inverting routine 70. If in a different device, the inverted transfer function (1/Z) or data indicative thereof is provided over the communication loop, such as the Fieldbus loop 48, in any known or desired manner. The compensation routine 72 multiplies or otherwise applies the inverted transfer function (1/Z) to the control signal U to produce an adjusted control signal U'. The compensation routine 72 may be located in the same or a different device as the controlled device 74. If located in the same device, the compensation routine 72 may receive the control signal U, apply the compensation and then provide the adjusted control signal U' to the controlled device 74 or, more precisely, to a routine executed within the controlled device 74. If the compensation routine 72 is within a different device, such as in a different field device, then the compensation routine 72 transmits the adjusted control signal U' to the controlled device 74 via the communication network, such as the Fieldbus loop 48. If the DCN 20 utilizes the Fieldbus protocol, communication between the compensation routine 72 and the controller 38 will normally be implemented within the scheduled communications window for that routine to assure that compensation is integrated into each control signal U produced by the controller 38.

Of course, the modeling routine 66, the inverting routine 70 and the compensation routine 72 may be located in the same or different devices. While the modeling routine 66 will generally be located in the measurement device 68 to avoid overloading the Fieldbus network 48 with excessive amounts of data, the inverting routine 70 and the compensation routine 72 can, if so desired, be located in other devices because the volume of communications between these routines will typically be a lot less. In one example, the modeling routine 66 and the inverting routine 70 are located tin the measurement device 68 while the compensation routine is located in the controlled device 74. However, for example, the inverting routine 70 and the compensation routine 72 can all be located in different devices, such as within another field device or within the controller 38 itself. In this example, it may be beneficial to use some kind of data compression routine, such as those discussed above, to compress the data to be transmitted.

Preferably, the modeling routine 66 computes a new model corresponding to every period of the low frequency measurement data $Y_{LF}$ so that a new transfer function is updated and used on each control signal U developed by the controller 38. However, if desired, the modeling routine 66 can create new noise model or update the noise model at a less frequent rate so that the transfer function Z is updated less frequently. Still further, the compensation routine 72 may provide an adjusted control signal U' at a greater rate than the controller 38 provides a control signal U. This will generally be useful when the transform function Z is time varying or when the error and compensation signal are being determined and applied continuously.

Figure 4:
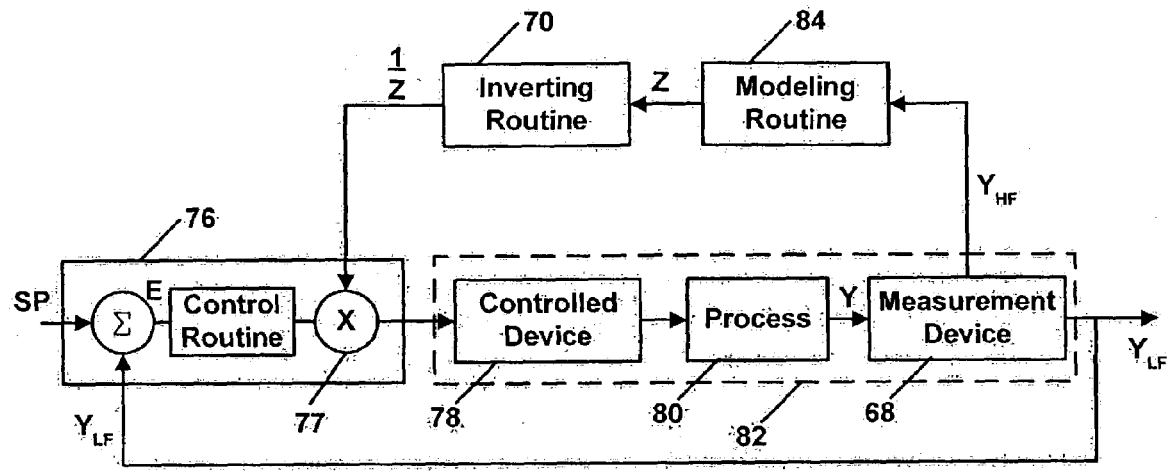
FIG. 4 is a schematic block diagram illustrating data flow within another embodiment of a high frequency noise compensation system.

FIG. 4 illustrates another embodiment of the high frequency compensation system showing different locations for the different measurement, modeling and inverting components. In this embodiment, as has been previously described, a controller 76 develops an error signal E as the difference between the low frequency measurements $Y_{LF}$ and the set point SP. In addition, the controller 76 integrates the compensation routine 77, previously identified in FIG. 3 by the numeric designator 72, to generate the adjusted control signal U'. The adjusted control signal U' is communicated to the controlled device 78 which, in turn, performs some function within the process 80, such as adjusting the temperature of a mixture or changing the position of a valve to adjust the flow rate, in accordance with the control routine executed by the controller 76.

FIG. 4 further illustrates the measurement device 68 within, or is communicatively connected to, a device that is within the process 82. In this example, the measurement device 68 is pa smart device capable of capturing and storing the aggregate measurement data in its local memory. The measurement device 68 may then execute a routine to parse the aggregate measurement data to obtain the low frequency measurements $Y_{LF}$ which are communicated in any known manner to the controller 76 as a feedbback signal. The measurement device 68 may compress the high frequency measurement data $Y_{HF}$ for transmittal to a modeling routine 84 within another device or may send this data without compression. Regardless of the communication procedure, information is communicated to the device which stores the modeling routine 84. Utilizing the data received from the measurement device 68, the modeling routine 84 develops a model Z, which may be a transfer function or any other known compensation function, representing the high frequency noise within the process variable Y. The model Z is then communicated to an inverting routine 70, which may be located within the same field device as the modeling routine 84 or in a different device communicatively connected to the device 84 via the Fieldbus network 48. The inverting routine 70 calculates the inverted transfer function (1/Z) of the noise model Z provided by the modeling routine 66. The resulting inverted transfer function (1/Z) is then communicated to the compensation device within the controller 38 where it is utilized in combination with the error signal E to generate the adjusted control signal U'.

Figure 5:
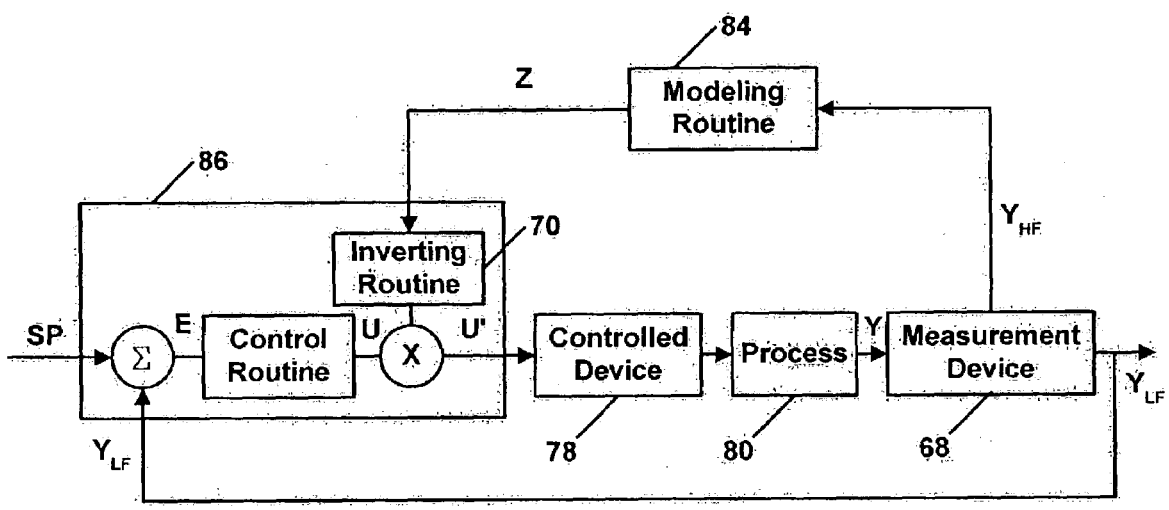
FIG. 5 is a schematic block diagram illustrating data flow within another embodiment of a high frequency noise compensation system.

FIG. 5 illustrates, another embodiment of the high frequency compensation system, system showing different locations for the different measurement, modeling and inverting components. The illustrated embodiment highlights one of the numerous ways a system utilizing smart devices may be configured to maximize processing efficiency, system utilization, or other desired parameters. In this embodiment a model Z, typically a transfer function representing the high frequency noise present within the process 80, is calculated by the modeling routine 84 and is provided to the controller 86. In this configuration, the controller 86 includes the inverting routine 70 which may be used to calculate the inverse transfer function (1/Z). The inverted transfer function (1/Z) and the error signal E may then be used to generated an adjusted control signal U' which is provided to the field device tasked with compensating for the high frequency noise within the process 80.

In some cases, it may be desirable to use time synchronization to effect proper high frequency error determination and compensation. For example, a wireless time synchronization system, such as one based on a wireless global positioning system (GPS) or the national time standard system which sends a signal out of Bolder, Colo., can be used to synchronize all the data in time using time stamps. In this example, each device may have a wireless or other receiver, such as a GPS, receiver, for receiving a synchronized time signal and use this time signal to update an internal clock. The clock may then be used to accurately time stamp each data signal being sent by the device. In this manner, proper time delay compensation can be used or implemented in the high frequency model or in the device that generates the high frequency compensation signal to account for the time delays in sending the data from one device to another.

Still further, if desired, the high frequency noise compensation system may use pseudo-random binary sequence signals initiated by, for example, the intelligent control device, such as the valve or controller, to determine the transport lag and phase between the control device (e.g. the actuator) and the measured variables at transmitters and/or analyzers or devices. This time lag could then be used in determining the high frequency noise, as well as a proper compensation signal. Of course, this system would require pseudo-random sequence generators and decoders within the devices and routines which would place these pseudo-random sequences on or strip them off of signals being sent from one device to another.

Of course, the techniques described herein may be extended to a multivariable case (such as in process optimization) by either initially or continuously estimating the total derivative of the variables of interest with respect to the multiple measurements and/or actuator parameters involved and summing the weighted disturbance inverse model inputs with the actuator signals. The weights used in the weighting process may be determined by calculating the ratio of the relevant partial derivative gain with respect to the total derivative influence model.

While the present invention has been described with reference to specific examples which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A control system for use in a distributed process control network, the control system comprising:
    a controller that generates a control signal based on measurements of at least one process variable, the process variable measurements being made at a first frequency;
    a controlled device communicatively connected to the controller;
    a measurement device communicatively connected to the controller, the measurement device adapted to collect measurements of the process variable at a second frequency greater than the first frequency and to provide measurements of the process variable at the first frequency to the controller;
    a modeling routine stored in a memory and adapted to be executed on a processor, the modeling routine adapted to use the measurements of the process variables made at the second frequency to derive a noise model of the high frequency noise present within the process variable; and
    a signal combiner communicatively connected to the controller and to the modeling routine that generates an adjusted control signal from the control signal and the noise model, the signal combiner being further communicatively connected to the controlled device to provide the adjusted control signal to the controlled device to reduce the high frequency noise present within the process variable.

2. The control system of claim 1, wherein the controlled device is a smart actuator.

3. The control system of claim 1, wherein the modeling routine is adapted to derive a noise model that includes one or more of a time variant linear component, a time variant cyclical component and a time variant white noise component.

4. The control system of claim 1, wherein the modeling routine is adapted to use a Fourier analysis to determine an estimate of the high frequency noise.

5. The control system of claim 1, wherein the memory storing the noise modeling routine is in a device other than the controller.

6. The control system of claim 1, wherein the memory storing the noise modeling routine is located within the controlled device.

7. The control system of claim 1, wherein the memory storing the noise modeling routine is located within the measurement device.

8. The control system of claim 1, wherein the noise modeling routine includes a transfer function routine for determining a transfer function of the high frequency noise within the process variable, and an inverter routine adapted to invert the transfer function.

9. The control system of claim 8, wherein the inverter routine is located within the controlled device.

10. The control system of claim 8, wherein the inverter routine is located within a device other than the controller.

11. The control system of claim 8, wherein the inverter routine is integrated within the controller.

12. The control system of claim 11, wherein the inverter routine inverts the noise model transfer function and the signal combiner multiples the resulting inverted noise transfer function by the control signal.

13. The control system of claim 1, wherein the controller is communicatively connected to a network and is adapted to transmit the control signal to a controlled device communicatively connected to the network through a subnet.

14. The control system of claim 13, wherein the measuring device is communicatively connected to the subnet.

15. The control system of claim 14, wherein the memory storing the noise modeling routine is integrated into the measurement device, and the measurement device is communicatively connected to the controlled device through the subnet.

16. The control system of claim 15, wherein the signal combiner is integrated into the controlled device.

17. The control system of claim 1, wherein at least one of the controller, the controlled device and the measurement device includes a pseudo-random sequence generator adapted to generate pseudo-random sequences and wherein the signal combiner uses the pseudo-random sequences to generate the adjusted control signal.

18. The control system of claim 1, further including a data compression routine adapted to compress data.

19. The control system of claim 1, wherein the signal combiner continuously determines the adjusted control signal.

20. The control system of claim 1, wherein the signal combiner is adapted to generate the adjusted control signal so as to minimize residual cyclic error within a process variable.

21. The control system of claim 1, further including a source of a synchronized time source located in at least two of the controller, the controlled device and the measurement device.

22. A method of reducing high frequency process variations within a process control system, the method comprising the steps of:
    generating a control signal in response to at least one process variable received at a first rate in a first device;

collecting measurement, away from the first device, of at least one process variable at a second rate greater than the first rate;

determining, away from the first device, a noise model based on the measurements of the at least one process variable captured at the second rate;

generating an adjusted control signal based on the control signal and the noise model, and using the adjusted control signal to reduce the high frequency noise within the process variable.

23. The method of claim 22, wherein the step of determining the noise model further includes the step of calculating a transfer function representing the high frequency noise present within the process variable.

24. The method of claim 23, wherein the step of generating the adjusted control signal further comprises the step of calculating the inverse of the noise model transfer function.

25. The method of claim 24, wherein the step of generating the adjusted control signal further comprises the step of multiplying the control by the inverse of the noise model transfer function.

26. The method of claim 22, further including the steps of generating pseudo-random sequences and using the pseudo-random sequences to generate the adjusted control signal.

27. The method of claim 22, further including the step of compressing data prior to sending the data between two or more devices within the process control system.

28. The method of claim 22, wherein the step of generating the adjusted control signal includes the step of continuously determining the adjusted control signal and further including the step of continuously applying the adjusted control signal to a controlled device.

29. The method of claim 22, wherein the step of generating the adjusted control signal includes the step of determining the adjusted control signal so as to minimize residual cyclic error within a process variable.

30. The method of claim 22, further including the step of time synchronizing data within the process control system using a time source located in at least two devices within the process control system.

31. The method of claim 22, wherein the step of determining includes the step of using a Fourier analysis to determine the noise model.

* * * * *

UNITED STATES PATENT AND TRADEMARK OFFICE
CERTIFICATE OF CORRECTION

PATENT NO. : 7,103,426 B2 Page 1 of 1
APPLICATION NO. : 10/352624
DATED : September 5, 2006
INVENTOR(S) : Marion A. Keyes, IV It is certified that error appears in the above-identified patent and that said Letters Patent is hereby corrected as shown below:

At Column 1, line 15, "chemical" should be -- chemical, --.

At Column 1, line 22, "servo motors" should be -- servomotors --.

At Column 3, lines 51-52, "compensations" should be -- compensation --.

At Column 4, line 2, "PROFIBUs" should be -- PROFIBUS --.

At Column 6, line 45, "is would generally" should be -- is generally --.

At Column 8, line 11, "is pa" should be -- is a --.

At Column 8, line 37, "illustrates," should be -- illustrates --.

At Column 8, line 51, "generated" should be -- generate --.

At Column 8, line 62, "GPS," should be -- GPS --.

Signed and Sealed this

Fourteenth Day of August, 2007

JON W. DUDAS
*Director of the United States Patent and Trademark Office*